US006744158B2

(12) United States Patent
Liang et al.

(10) Patent No.: US 6,744,158 B2
(45) Date of Patent: *Jun. 1, 2004

(54) ELECTRIC MACHINE WITH COOLING RINGS

(75) Inventors: Feng Liang, Canton, MI (US); Mikhail Avramovich Avanesov, Dearborn, MI (US); Xingyi Xu, Canton, MI (US)

(73) Assignee: Ballard Power Systems Corporation, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/683,018

(22) Filed: Nov. 8, 2001

(65) Prior Publication Data

US 2002/0089244 A1 Jul. 11, 2002

Related U.S. Application Data

(63) Continuation-in-part of application No. 09/758,871, filed on Jan. 11, 2001.

(51) Int. Cl.⁷ .............................. H02K 9/00; H02K 9/22
(52) U.S. Cl. ............................. 310/64; 310/91; 310/43
(58) Field of Search ........................... 310/43, 64, 87, 310/260, 58, 51, 89, 91; 29/596–598

(56) References Cited

U.S. PATENT DOCUMENTS

| | | | | |
|---|---|---|---|---|
| 2,975,309 A | * | 3/1961 | Seidner ........................ 310/58 |
| 3,075,107 A | * | 1/1963 | Eis et al. ...................... 310/64 |
| 3,123,729 A | * | 3/1964 | Fagel ........................... 310/43 |
| 3,155,856 A | * | 11/1964 | Macha et al. ................. 310/57 |
| 3,525,889 A | * | 8/1970 | Robinson et al. ............. 310/45 |
| 3,688,137 A | | 8/1972 | Filhol ........................... 310/43 |
| 4,054,809 A | * | 10/1977 | Jefferies ...................... 310/256 |
| 4,464,593 A | | 8/1984 | Kofink ......................... 310/58 |
| 4,492,884 A | | 1/1985 | Asano et al. ................. 310/45 |
| 4,634,908 A | | 1/1987 | Sturm .......................... 310/64 |
| 4,651,039 A | * | 3/1987 | Yamamoto et al. ........... 310/87 |
| 4,745,314 A | | 5/1988 | Nakano ........................ 310/57 |
| 4,864,176 A | | 9/1989 | Miller et al. ................. 310/194 |
| 4,963,776 A | | 10/1990 | Kitamura ..................... 310/64 |
| 5,053,658 A | | 10/1991 | Fakler et al. ................. 310/64 |
| 5,101,128 A | * | 3/1992 | Veronesi et al. .............. 310/54 |
| 5,363,002 A | | 11/1994 | Hernden et al. .............. 310/54 |
| 5,394,043 A | * | 2/1995 | Hsia ............................ 310/51 |
| 5,576,584 A | * | 11/1996 | Kusumoto et al. ............ 310/45 |
| 5,578,879 A | | 11/1996 | Heidelberg et al. ........... 310/54 |
| 5,789,833 A | * | 8/1998 | Kinoshita et al. ............. 310/64 |
| 6,043,583 A | | 3/2000 | Kurosawa et al. ............ 310/254 |
| 6,201,321 B1 | | 3/2001 | Mosciatti et al. ............. 310/43 |
| 6,445,095 B1 | * | 9/2002 | Liang et al. .................. 310/64 |

* cited by examiner

Primary Examiner—Tran Nguyen
(74) Attorney, Agent, or Firm—Seed IP Law Group PLLC

(57) ABSTRACT

An electric machine in accordance with the invention includes a stator core having first and second ends and having windings therein with end turns of the windings protruding from the first and second ends of the stator core. A rotor is rotatably positioned within the stator core. A thermal conductor, such as non-laminated aluminum or aluminum alloy ring, is disposed between each stator core end-turn and the housing for conducting heat from the stator core end-turns to the housing, and the cavity between each end-turn and the thermal conductor is filled with a flexible potting material to minimize gap formation caused, for example, by thermal cycling of the engine components.

9 Claims, 2 Drawing Sheets

ELECTRIC MACHINE WITH COOLING RINGS

CROSS REFERENCE TO RELATED APPLICATIONS

This application is a continuation-in-part of co-pending U.S. patent application Ser. No. 09/758,871 filed Jan. 11, 2001 and entitled "Electric Machine With Laminated Cooling Rings," the disclosure of which is expressly incorporated herein by reference in its entirety.

BACKGROUND OF INVENTION

1. Field of the Invention

The present invention relates generally to the field of electric machines and more particularly to an electric machine having laminated or non-laminated cooling rings adjacent end-turns of the stator core windings for transferring heat from the windings to the housing.

2. Background Art

The cooling of stator windings of electric machines is critical for providing satisfactory motor performance, reliability and durability. This issue becomes even more pressing when the motor is required to have a high power density (kW/m$^3$) and low specific weight. An integrated starter/alternator is a good example where the electric motor is required to have high power density, low specific weight, and good cooling capability because of packaging constraints, fuel economy requirements, and the fact that the motor is in the engine compartment Thermally conductive epoxy potting materials have been applied on the end-turn windings to improve the cooling of an electric motor. FIG. 1 illustrates a motor 10 having such a feature. As shown, the motor 10 consists of a rotor 12 rotatably positioned within a stator core 14. The stator core 14 has first and second ends 16, 18 with end-turns 20, 22 of the windings extending from the ends 16, 18, respectively. A housing 24 having end plates 26, 28 encloses the stator core, windings and rotator. A thermally conductive potting material 30 is positioned over each of the end-turns 20, 22 for carrying heat directly from the end-turns 20, 22 to the housing 24 for heat dissipation.

This potting technology provides limited value because the potting material has a fairly high thermal resistance, which limits the heat dissipation capacity. Additionally, the cooling potential of the potting material cannot be fully utilized because of gaps which are developed between the potting material and the winding, and between the potting material and the housing as a result of thermal cycling of the motor. The reason for the gap development is that the potting material, the winding and the housing have different thermal expansion coefficients. The gaps are filled with air, which provides minimal thermal conductivity.

Accordingly, it is desirable to provide an improved method and apparatus for cooling an electric machine.

SUMMARY OF INVENTION

The present invention improves upon the above-described cooling method by providing two laminated aluminum ring assemblies at the opposing ends of the stator core which are embedded within the potting material. The laminated aluminum rings substantially enhance heat dissipation, while the laminations reduce eddy current buildup within the rings.

In a preferred embodiment, each lamination of the rings has a plurality of radially extending slots which provide air gaps to minimize eddy currents in a plane perpendicular to the central axis of the motor.

More specifically, the present invention provides an electric machine including a stator core having first and second ends and having windings therein with end-turns of the windings protruding from the first and second ends of the stator core. A rotor is rotatably positioned within the stator core. First and second laminated aluminum ring assemblies are positioned against the first and second ends, respectively, of the stator core in contact with the housing. Thermally conductive potting material is positioned between the end-turns and the respective first and second ring assembly at the first and second ends of the stator core, thereby creating heat dissipation paths from the end-turns, through the potting material and the ring assemblies to the housing.

An alternate embodiment of the present invention takes the form of an electric machine that includes, for example, a housing, a stator core disposed within the housing, and a rotor disposed rotatably within the stator core. The stator core has at least one end-turn that extends beyond an axial end of the stator core and is potted with a potting material. A thermal conductor ring, which can be metallic or a non-metallic and that provides thermal conductivity greater than the potting material, is disposed between the potted stator core end-turn and the housing for conducting heat from the stator core end-turn to the housing. Suitable materials for the thermal conductor ring include, for example, aluminum or aluminum alloy. In addition, the housing can have a coolant fluid circulated therein.

This thermal conductor ring that is disposed between the potted stator core end-turn and the housing has an outer face disposed against an inner surface of the housing that is pressed fit against the inner surface of the housing. Exemplarily, this may be through the utilization of thermal expansion and contraction to shrink fit the housing against the outer face of the thermal conductor ring. An example of a suitable range of thermal conductivity for the thermal conductor is at least 90 BTU/hr ft degree F at 300 degrees Kelvin. The stator core end-turn typically has a highly irregular surface so that good contact directly between the thermal conductor ring and the end-turn is not possible. Thus, a space is defined between the end-turn and the thermal conductor that is filled with the potting material. Typically, the potting material is a flexible, elastomeric and/or viscoelastic material that is arranged and utilized to minimize gap formation caused, for example, by thermal cycling of the engine components. Accordingly, one purpose of the invention is to provide an improved method and apparatus for cooling an electric machine wherein laminated aluminum ring assemblies are provided at opposing ends of the stator core for dissipating heat through a potting material from the end-turns of the windings.

It is a further feature and advantage of an alternate embodiment of the present invention to provide an electric machine having cooling rings, such as non-laminated aluminum cooling rings, for cooling the stator core windings of the electric machine.

The features and advantages of the present invention will be readily apparent from the following detailed description of the best mode for carrying out the invention when taken in connection with the accompanying drawings.

DETAILED DESCRIPTION

Figure 1:
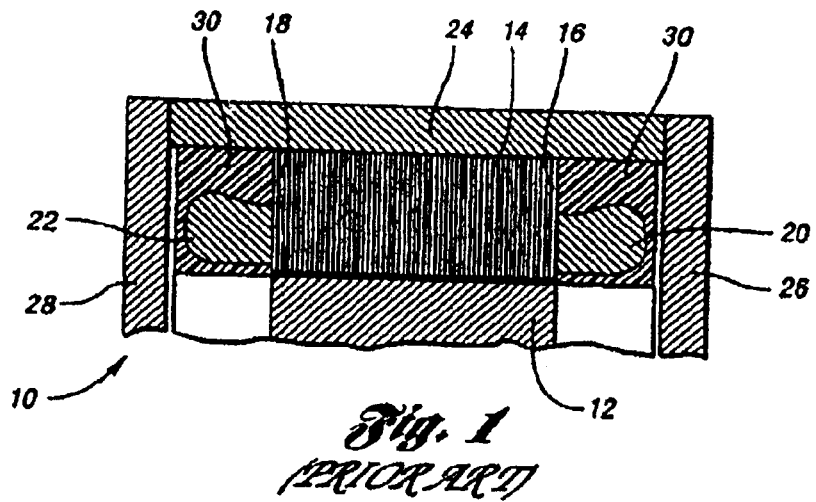
FIG. 1 shows a schematically arranged, partially cut-away vertical cross-sectional view of a previously known electric motor.
Figure 2:
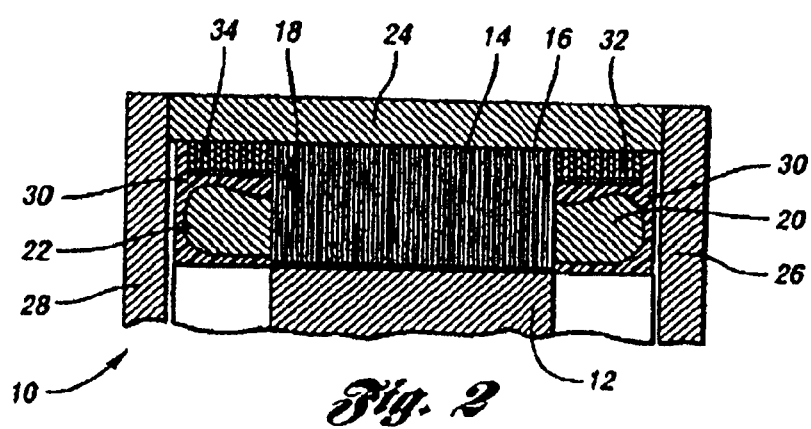
FIG. 2 shows a schematically arranged, partially cut-away vertical cross-sectional view of an electric motor configured in accordance with the present invention.

Referring to the figures, one embodiment of the present invention will now be described with reference to FIG. 2, wherein like reference numerals will be used to describe like components as those utilized previously with respect to FIG. 1.

As shown, the present invention provides an electric machine 10 including a rotor 12 rotatably positioned within a stator core 14. The stator core 14 has first and second opposing ends 16, 18 with end-turns 20, 22 of the stator core windings protruding from the respective ends 16, 18. A housing 24 includes first and second end plates 26, 28, which enclose the stator and rotor assembly.

A potting material 30 is positioned around the first and second end-turns 20, 22 of the windings. First and second laminated aluminum rings 32, 34 are positioned at the first and second ends 16, 18, respectively, of the stator core 14 in contact with the housing 24 for carrying heat from the end-turns 20, 22 through the potting material 30, through the laminated aluminum rings 32, 34 to the housing 24.

The housing 24 may be liquid cooled or air cooled, using configurations that are well known in the art.

Figure 3:
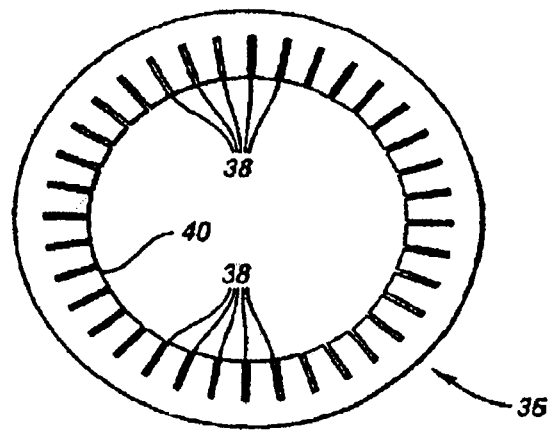
FIG. 3 shows a plan view of the ring incorporated into the arrangement of FIG. 2.

The laminations of the laminated aluminum ring assemblies 32, 34 are insulated to reduce eddy current losses. Additionally, because the magnetic fields around the end-turn windings 20, 22 are three-dimensional in nature, the invention also contemplates providing slots in the laminated aluminum rings extending radially, as shown in FIG. 3, to further reduce the eddy current in the rings. As shown in FIG. 3, each lamination (ring) 36 of the laminated ring assemblies 32, 34 is provided with a plurality of radially extending slots 38 extending from the annular, inner edge 40 of each lamination 36. These slots 38 extend approximately one-half the width of each ring 36 to reduce eddy currents in a plane perpendicular to a central axis of the electric machine.

The present invention significantly improves cooling capability over the above-described prior art methods. Because the aluminum of the ring assemblies has much higher thermal conductivity than the potting material (about 300 times higher), this invention has much better cooling capability, and as a result, the winding temperature will be significantly lower.

The potential of this cooling method is fully utilized because there will not be any gaps developed between the winding and the layer of potting material and between the ring and the potting material. The reason is that a flexible potting material 30 can be used. Even though the flexible potting material has higher thermal resistance than the non-flexible potting material, the total thermal resistance from the windings to the housing is still much lower than that of the existing potting technology. This is because the potting material is minimized in thickness. The existing potting technology must use a non-flexible potting material, which has a lower thermal resistance than the flexible one. There reason for this higher thermal resistance is the required thickness of the non-flexible potting material layer.

Another advantage of the present invention is that motor efficiency will be improved. Since the invention can lower the winding temperature significantly, the power loss in the winding will be reduced significantly because lower temperature leads to lower winding resistance.

The aluminum rings potted to the end windings also improve the stiffness of the electric machine.

Figure 4:
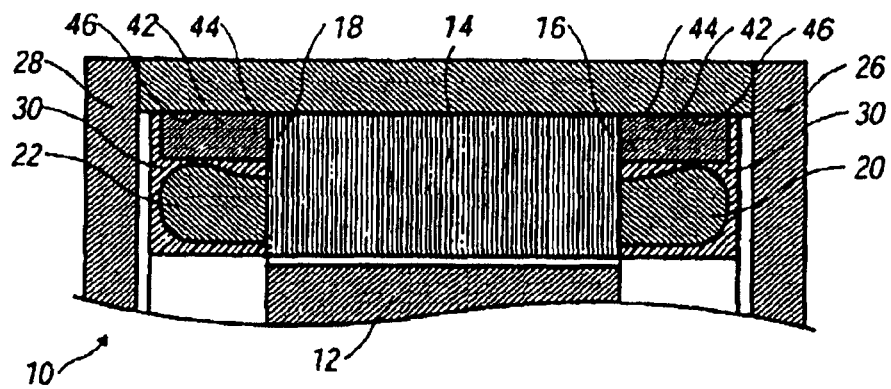
FIG. 4 shows a schematically arranged, partially cut-away vertical cross-sectional view of an electric motor with non-laminated cooling rings in accordance with an alternative embodiment of the present invention.
Figure 5:
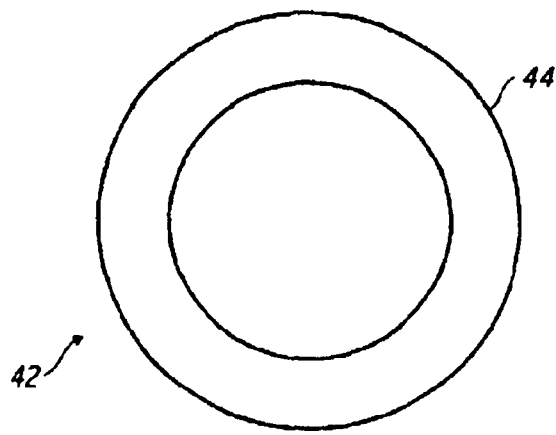
FIG. 5 shows a plan view of the non-laminated cooling ring incorporated into the electric motor arrangement of FIG. 4.

FIG. 4 shows a schematically arranged, partial cut-away vertical cross-sectional view of an electric motor with non-laminated cooling rings in accordance with an alternative embodiment of the present invention. FIG. 5 shows a plan view of an exemplary non-laminated cooling ring utilized in the arrangement of FIG. 4. This alternative embodiment addresses the issues of poor thermal conductivity and gap formation associated with the potting material 30 by replacing most of the potting material 30 with non-laminated rings 42 of a material with very high thermal conductivity disposed between the end-turns 20, 22 and the housing 24, as shown in FIG. 4.

In the alternative embodiment of FIGS. 4 and 5, most of the potting material 30 is replaced by the non-laminated thermal conductor rings 42 made of aluminum or aluminum alloy. It is noted that the thermal conductivity of aluminum at 300 degrees K is 137 BTU/hr ft degree F and of certain aluminum alloys at 300 degrees K is 90–95 BTU/hr ft degree F. However, thermal conductor rings 42 of any suitable material with a thermal conductivity substantially greater than the potting material 30 can be used as well. The interface between the aluminum rings 42 and the housing 24 is pressed fit, for tight face-to-face engagement which minimizes the thermal resistance between the conductor rings 42 and the housing 24.

While inserting the aluminum rings 42 into the arrangement of FIG. 4 minimizes the amount of potting material 30 in the thermal path, a certain amount of potting material 30 is still needed to fill the small spaces between the rings 42 and the end-turns 20, 22, because the surfaces of the end-turns 20, 22 are very irregular, and good contact directly between the rings 42 and the end-turns 20, 22 is not possible. A relatively thin layer of potting material 30 is used to fill the small space between the rings 40, 42 and the end-turns 20, 22, so that the thermal resistance from the end-turns 20, 22 to the housing 24 is minimized. Replacing most of the potting material 30 with the conductor rings 42 made of a material with a higher thermal conductivity than the potting material 30 significantly reduces the thermal resistance between the end-turns 20, 22 and the housing 24.

In addition, the conductor ring(s) 42 of the alternative embodiment are disposed up against the housing 24, which can be liquid cooled, so that heat is transferred directly through to the coolant (not shown) circulating in the housing 24. In order to have good contact between the conductor rings 42 and the housing 24, the housing 24 can be shrink fitted by heating and expanding the housing 24, inserting the stator core 14 in the housing 24, inserting the conductor rings 42 in the housing 24, and then allowing the housing 24 to cool and shrink to make a friction fit contact between an outer face 44 of the ring(s) 42 and an inner surface 46 of the housing 24.

A disadvantage of prior art potting technology is the use of non-flexible potting material, which, though it has a higher thermal conductivity than flexible potting material, necessary imposes a significantly greater thermal resistance in the illustrative arrangements because of the greater required thickness of the material used as compared to the use of non-flexible potting material which can be substantially thinner. The usage of non-flexible potting material, together with the thermal cycling of the electric motor, often causes a gap to development immediately adjacent to the motor because the inflexible potting material does not reconform to the smaller motor after a heating cycle.

One beneficial aspect of the alternative embodiment of the present invention shown in FIGS. 4 and 5 is the minimization, or elimination of the development of such gaps between the potting material and the end windings 20, 22 and between the potting material 30 and the housing 24 by using a potting material that has at least some degree of flexibility. However, generally speaking, as the flexibility of the potting material 30 is increased, the thermal conductivity of the potting material 30 decreases. For example, more elastic potting materials, such as various types of rubbers, typically have a very low thermal conductivity, while more rigid potting materials, such as various types of epoxies, typically have higher thermal conductivity characteristics.

In this aspect of the alternate embodiment, a flexible potting material with a certain degree of elasticity is used to avoid the development of gaps between the end-turns 20, 22 and the potting material 30, or between the conductor rings 42 and the potting material 30. Although flexible potting materials typically have a lower thermal conductivity than non-flexible potting materials, the total thermal resistance from the end-turns 20, 22 to the housing 24 is still much lower than in previously known arrangements because the amount and thickness of flexible potting material 30 is minimized.

The flexible potting material for the alternate embodiment can include, for example, a material that is elastomeric and/or that is viscoelastic; that is, a material that is viscous, yet is also an elastomeric material that exhibits certain elastic properties. Further, the flexible potting material can include any elastomeric material and/or viscoelastic material that does not experience a significant degradation in properties at high temperature levels. In general, any suitable elastomeric and/or viscoelastic material can be used for the flexible potting material.

An important advantage of an electric machine 10 that utilizes conductor ring(s) 42 configured according to the embodiment of FIGS. 4 and 5, is that the peak torque capability of the electric motor 10 will be increased if the motor is an induction motor. The maximum torque capability of an induction motor is limited by its leakage inductance. Since the eddy current induced in the aluminum conductor rings 42 reduce the leakage inductance, the induction motor peak torque capability is improved by the inclusion of the aluminum ring(s) 42.

Another important advantage of the electric machine 10 with the conductor rings 42 of FIGS. 4 and 5 is that the electric motor's efficiency will be improved. Since an embodiment of the present invention lowers the winding temperature significantly, the loss in the copper winding will be reduced significantly because lower temperature leads to lower winding resistance. Even though there may be an extra loss caused by the eddy current in the conductor rings 42, the loss reduction in the winding is greater than the added loss due to the conductor rings 42. Therefore, it is expected that overall loss in the motor 10 will be reduced. This invention has a wide range of applications. It can be used for any variety of electric machines, but has particular applicability in the auto industry because the auto industry typically provides harsh thermal operating conditions. For example, the invention can be used in traction motors for fuel cell powered electric vehicles, pure electric vehicles and hybrid electric vehicle. Also, utilization of the present invention also finds utility in integrated starter/alternator implementations and/or as high output alternators. The simplicity of the design makes the invention very easy to implement.

While exemplary embodiments have been described for carrying out the invention, those familiar with the art to which this invention relates will recognize various alternative designs and embodiments for practicing the invention within the scope of the appended claims.

What is claimed is:

1. An electric machine with cooling rings, comprising:

a housing;

a stator core disposed within the housing and comprising at least one end-turn extending beyond an end of the stator core, the end-turn being potted with a potting material;

a rotor rotatably positioned within the stator core;

a non-laminated thermal conductor ring having a thermal conductivity that is greater than a thermal conductivity of the potting material disposed between the potted stator core end-turn and the housing for conducting heat from the stator core end-turn to the housing, wherein the thermal conductor ring is a non-metallic thermal conductor ring disposed between the potted stator core end-turn and the housing.

2. The electric machine of claim 1, wherein the housing has a coolant fluid circulated therein.

3. The electric machine of claim 1, wherein the thermal conductor ring further comprises an outer face thereof disposed against an inner surface of the housing.

4. The electric machine of claim 1, wherein the thermal conductivity of the thermal conductor ring is at least 90 BTU/hr ft degree F.

5. The electric machine of claim 1, wherein the thermal conductivity of the thermal conductor ring is at least 300 times greater than the thermal conductivity of the potting material.

6. The electric machine of claim 1, further comprising a space defined between the potted stator core end-turn and the thermal conductor ring that is filled with the potting material.

7. The electric machine of claim 1, wherein the potting material is a flexible potting material.

8. The electric machine of claim 7, wherein the flexible potting material is an elastomeric potting material.

9. The electric machine of claim 7, wherein the flexible potting material is a viscoelastic potting material.

* * * * *